United States Patent [19]

Yamada et al.

[11] Patent Number: 4,711,870

[45] Date of Patent: Dec. 8, 1987

[54] EXHAUST GAS PURIFYING CATALYST

[75] Inventors: Chikara Yamada, Higashimurayama; Yoji Watabe, Hachioji; Koichi Irako, deceased, late of Higashimurayama, by Sanae Irako, legal heir; Yuichi Murakamai, Nagoya, all of Japan

[73] Assignee: Bridgestone Corporation, Tokyo, Japan

[21] Appl. No.: 855,943

[22] Filed: Apr. 25, 1986

[30] Foreign Application Priority Data

Apr. 27, 1985 [JP] Japan .................................. 60-92072
Dec. 13, 1985 [JP] Japan ................................ 60-279219

[51] Int. Cl.$^4$ ........................ B01J 21/04; B01J 23/10; B01J 23/22; B01J 23/72
[52] U.S. Cl. .................................... 502/303; 502/304; 502/312; 502/329; 502/331; 502/345; 502/346; 423/215.5
[58] Field of Search ............... 502/303, 331, 304, 312, 502/324, 329, 343, 345, 346; 423/213.2, 213.5, 213.7, 215.5

[56]  References Cited

U.S. PATENT DOCUMENTS

| | | | |
|---|---|---|---|
| 3,249,558 | 5/1966 | Kearby | 423/213.2 X |
| 3,271,446 | 9/1966 | Kerr | 502/324 X |
| 3,438,721 | 4/1969 | Innes | 423/213.2 |
| 3,897,471 | 7/1975 | Herbert et al. | 502/324 X |
| 4,503,162 | 3/1985 | Windawi et al. | 502/331 X |
| 4,515,758 | 5/1985 | Domesle et al. | 502/348 X |

FOREIGN PATENT DOCUMENTS 55-1097  11/1980  Japan .

*Primary Examiner*—W. J. Shine
*Attorney, Agent, or Firm*—Birch, Stewart, Kolasch & Birch

[57] ABSTRACT

A catalyst comprising (a) copper or a copper compound; (b) vanadium or a vanadium compound; (c) zirconium, aluminum, nickel, iron, manganese, lanthanum, chromium, zinc, lead, or cerium, or a compound thereof; and optionally, (d) platinum, rhodium, or palladium, or a compound thereof is carried on a porous ceramic body to assist in purifying exhaust gases from Diesel engines.

11 Claims, No Drawings

EXHAUST GAS PURIFYING CATALYST

BACKGROUND OF THE INVENTION

This invention relates to a catalyst for assisting in burning out particulates in engine exhaust, especially exhaust gas from Diesel engines. More particularly, this invention relates to an exhaust purifying catalyst of the type used in combination with a collector for trapping particulates in exhaust gas from an engine, which catalyst allows the temperature required for burning out particulates on the collector to be lowered and assists in burning out a substantial portion of particulates on the collector when the exhaust gas passing through the collector reaches a relatively high temperature under certain operating conditions of the engine.

It was found that particulates in engine exhaust, particularly particulates in exhaust gases from Diesel engines contain carcinogenic substances such as benzpyrene and nitropyrene. It has been a serious problem in view of pollution control to remove such particulates from engine exhaust.

There are known many collectors for collecting and removing particulates from exhaust. Typical are heat resistant collectors such as ceramic honeycombs, ceramic foams, metal mesh fillers, alumina or other pellet-like carrier fillers, and ceramic fibers.

However, as particulates progressively collect and deposit on such collectors, the collectors becomes clogged and do permit smooth passage of exhaust gases. After a certain period of operation, the collectors must be subjected to a burning treatment for regeneration. The burning treatment is generally by burning the particulates on the collectors by means of a burner. The burning treatment is undesirable in that the collectors are deteriorated by a thermal shock caused by the combustion of particulates. There is a likelihood of secondary pollution from noxious gases such as carbon monoxide and nitrogen oxides which have resulted from incomplete combustion.

A concept of carrying catalysts on collectors to lower the burning temperature of collected particulates as well as preventing the generation of noxious gases, was devised.

Based on this concept, the present inventors found several useful catalysts. Some are disclosed in Japanese Patent Application Kokai Nos. 58-18394 and 58-143840. More specifically, Japanese Patent Application Kokai No. 58-18394 discloses an exhaust gas purifying catalyst comprising in combination, (a) at least one member selected from the group consisting of vanadium, molybdenum, and compounds thereof, (b) at least one member selected from the group consisting of alkali metals and compounds thereof, and optionally (c) at least one member selected from the group consisting of copper and compounds thereof.

Japanese Patent Application Kokai No. 58-143840 discloses a particulate purifying catalyst comprising in combination, (a) at least one member selected from the group consisting of copper and copper compounds, for example, copper oxide and (b) at least one member selected from the group consisting of metals capable of taking plural oxidation forms and compounds thereof, for example, germanium, tin, vanadium, niobium, antimony, bismuth, chromium, molybdenum, tungsten, selenium, tellurium, lanthanum, cerium, praseodymium, rhenium, ruthenium, and rhodium, and compounds thereof.

These catalysts, however, are not fully satisfactory with respect to activity and durability as catalysts for assisting in purifying exhaust gases from Diesel engines.

Among the aforementioned catalysts, those catalysts which consist of two components, Cu and V exhibit a very high activity. In order that the catalysts exert their maximum effect, it is desired that the particulate collector having the catalyst carried thereon be located at a position near the engine where a high exhaust gas temperature is available.

The high temperature of exhaust gas gives rise to the problem that sulfur dioxide in the exhaust is oxidized with the aid of catalyst to generate sulfuric acid mist. This problem is serious particularly with trucks and buses which have frequent opportunities to operate under high loads in the course of their normal use and thus discharge exhaust gas at relatively high temperatures.

SUMMARY OF THE INVENTION

An object of the present invention is to provide an exhaust gas purifying catalyst which allows particulates trapped on a collector to be burned at a lower temperature.

According to the present invention, there is provided a catalyst for assisting in purifying exhaust gases comprising
(a) at least one member selected from the group consisting of copper and copper compounds;
(b) at least one member selected from the group consisting of vanadium and vanadium compounds; and
(c) at least one member selected from the group consisting of zirconium, aluminum, nickel, iron, manganese, lanthanum, chromium, zinc, lead, and cerium, and compounds thereof.

The catalysts of the present invention allow the particulate burning temperature to be lowered below the level required for prior art catalysts. The term particulate burning temperature is the temperature at which particulates trapped on collectors from exhaust gases are burned out. The catalysts are carried on suitable collectors such as ceramic honeycombs and ceramic foams. Then the collectors can be regenerated at a lower temperature, saving the heat energy required for regeneration. At the same time, only a mitigated thermal shock is applied to the collectors during the regeneration operation. The collectors thus have an extended life.

With the use of the present catalysts, the particulate burning temperature may be lowered to the temperature reached by the exhaust gas from an engine under operating conditions. Particulates trapped on the collector from the exhaust gas can be burned out by utilizing the heat of the exhaust gas. This means that regeneration of the collector also takes place during the operation of an engine. Thus the use of the present catalysts eliminates the need for collector regeneration operation or at least reduces the frequency of regeneration operation, extending the service period of the collectors.

Since the present catalysts are highly resistant to sulfur dioxide, collectors having the present catalysts attached thereon may be used for an extended period of time. Since the present catalysts enable the complete combustion of particulates, generation of noxious gases such as carbon monoxide is inhibited upon regeneration of the collectors.

With respect to the activity of oxidizing sulfur dioxide gas ($SO_2$) in the exhaust into sulfur trioxide ($SO_3$) which will undesirably react with water in air to form sulfuric acid mist, those of the present catalysts wherein component (c) used is at least one member selected from nickel, iron, manganese, lanthanum, chromium, zinc, lead, and cerium, and compounds thereof are poorer than the prior art catalysts. Some contribution is expectable to the problem of acidic rain which now draws a serious attention from the standpoint of forest destruction. Despite the aforementioned feature, the catalysts wherein component (c) used is nickel, iron, manganese, lanthanum, chromium, zinc, lead, or cerium, or a compound thereof exhibit excellent catalysis and durability comparable to the prior art catalysts. By carrying the catalysts on collectors such as ceramic honeycombs and ceramic foams and setting the catalyzed collectors in place at a relatively high exhaust gas temperature, for example, in the proximity of the manifold, not only particulates in the exhaust gas are collected, but also the collected particulates are spontaneously burned out during the engine operation without generating sulfate gases. The need for extra equipment for regenerating the collectors is eliminated.

According to the preferred embodiment of the present invention, the exhaust gas purifying catalysts contain (d) at least one member selected from the group consisting of platinum, rhodium, and palladium, and compounds thereof in addition to components (a), (b), and (c). They not only retain the same effects as the three component catalysts, but also ensure more efficient burning out of particulates having an increased content of hydrocarbon oils.

DETAILED DESCRIPTION OF THE INVENTION

The exhaust gas purifying catalysts of the present invention comprise three components (a), (b), and (c), and more preferably four components (a), (b), (c), and (d). There are provided catalysts comprising (a) at least one member selected from the group consisting of copper and copper compounds;

(b) at least one member selected from the group consisting of vanadium and vanadium compounds;

(c) at least one member selected from the group consisting of zirconium, aluminum, nickel, iron, manganese, lanthanum, chromium, zinc, lead, and cerium, and compounds thereof; and optionally, (d) at least one member selected from the group consisting of platinum, rhodium, and palladium, and compounds thereof.

Component (a) used in the present catalysts is selected from copper and copper compounds. The copper ion of the copper compound may either cuprous or cupric. Examples of the copper compounds include copper nitrate, copper chloride, copper oxide, copper sulfate, copper oxalate, copper acetate, copper carbonate, copper hydroxide, ammonium copper chloride, ammonium copper hydroxide, and ammonium copper phosphate, with the copper nitrate, copper chloride, and copper oxide being preferred.

Component (b) used in the present catalysts is selected from vanadium and vanadium compounds. Examples of the vanadium compounds include ammonium vanadate, vanadyl dichloride, vanadium oxytrichloride, vanadyl sulfate, vanadium pentoxide, vanadium trioxide, vanadium dichloride, vanadium trichloride, vanadium tetrachloride, lithium vanadate, sodium vanadate, and potassium vanadate, and sintered products thereof.

Component (c) used in the present catalysts is selected from zirconium, aluminum, nickel, iron, manganese, lanthanum, chromium, zinc, lead, and cerium, and compounds thereof. Examples of the zirconium compounds include zirconium oxide, zirconium oxynitrate, zirconium nitrate, zirconium chloride, zirconium oxychloride, zirconium sulfate, and zirconium acetylacetate. Examples of the iron compounds include iron nitrate, iron oxide, iron chloride, iron phosphate, iron sulfate, iron hydroxide, ammonium iron sulfate, and ammonium iron oxalate. Examples of the aluminum compounds include aluminum chloride, aluminum nitrate, aluminum sulfate, aluminum oxalate, aluminum hydroxide, and alum. Examples of the nickel compounds include nickel oxide, nickel chloride, nickel nitrate, nickel phosphate, nickel sulfate, ammonium nickel chloride, ammonium nickel sulfate, nickel formate, nickel acetate, and nickel hydroxide. Examples of the manganese compounds include manganese chloride, manganese nitrate, manganese sulfate, manganese dioxide, manganese phosphate, and manganese oxalate. Examples of the lanthanum compounds include lanthanum chloride, lanthanum nitrate, lanthanum oxide, lanthanum carbonate, and lanthanum oxalate. Examples of the chromium compounds include chromium chloride, chromium nitrate, chromium sulfate, chromium oxide, chromium phosphate, chromium formate, chromium carbonate, chromic acid, and chromium hydroxide. Examples of the zinc compounds include zinc nitrate, zinc chloride, zinc acetate, ammonium zinc chloride, zinc carbonate, zinc oxalate, zinc sulfate, ammonium zinc sulfate, zinc oxide, and zinc hydroxide. Examples of the lead compounds include lead nitrate, lead chloride, lead sulfate, lead carbonate, lead formate, lead oxalate, lead phosphate, lead oxide, and lead hydroxide. Examples of the cerium compounds include cerium nitrate, cerium chloride, cerium carbonate, cerium oxalate, and cerium oxide.

No particular limit is imposed on the blend ratio of components (a), (b), and (c) in the exhaust gas purifying catalyst of the present invention. Although components (a), (b), and (c) may be blended in any desired proportion, they are generally blended so as to give an atomic ratio of $[(a)+(b)]/(c)$ of from 99/1 to 20/80, preferably from 90/10 to 50/50. Although no particular limit is imposed on the blend ratio of components (a) to (b), they are generally blended so as to give an atomic ratio of $(a)/(b)$ of from 99/1 to 1/99, preferably from 80/20 to 20/80.

In general, the catalysts are carried on particulate collectors such as porous ceramic bodies. The amount of the catalysts borne on the collector ranges from 1 to 20% by weight, preferably from 3 to 10% by weight based on the weight of the collector.

The fourth component, that is, (d) at least one member selected from platinum, rhodium, palladium, and compounds thereof may be incorporated in the catalysts consisting of the above-mentioned three components. In general, particulates in exhaust gases are formed of carbon and hydrocarbon oil values. The proportion of the hydrocarbon oil value varies in the range from about 1 to about 30% by weight with the operating conditions of the engine. The catalysts having additional component (d) combined exert increased catalysis to the combustion of particulates having a relatively high content of hydrocarbon oil due to the function of component (d). The amount of component (d) borne generally ranges from about 0.01 to about 5 grams per kilogram of the collector.

The exhaust gas purifying catalysts of the present invention are generally carried on suitable collectors before they are used in practice. The catalyst may be carried on a collector by previously coating the internal surface of the collector with alumina, titania, zirconia, silica, magnesia, potassium titanate or a solid acid and then applying the catalyst to the collector via the coating. Alternatively, the catalyst may be mixed with such a supporting aid into a slurry which is applied to the collector followed by drying. The solid acids used herein include silica-alumina, silica-zirconia, titania-zirconia, titania-silica, and alumina-boria.

Examples of the exhaust gas purifying catalyst of the present invention are given below by way of illustration and not by way of limitation.

EXAMPLE 1

An experiment was carried out to observe that the exhaust gas purifying catalyst of the present invention allows particulates in engine exhaust gas to be burned out at a lower temperature than with prior art catalysts, is less active in oxidizing sulfur dioxide in the exhaust gas into sulfate, and has improved durability.

A collector was prepared by applying a catalyst as specified later onto a porous ceramic body. To evaluate the durability of the catalyst, the catalyzed porous ceramic body was exposed to sulfur dioxide gas which is contained in engine exhaust gas and believed to be one of factors causing deterioration of catalysts. The test was carried out by exposing the catalyzed porous ceramic body for 30 minutes to an exhaust gas in the form of combustion gases resulting from a burner fueled with light oil. To set severe test conditions, the light oil used contained about 1.4 kg of dodecathiol per 10 kg of light oil, that is, a sulfur content of about 2% by weight. The flow rate of the exhaust gas was set to 800 liters per minute calculated under room temperature conditions. The exhaust gas had an oxygen content of about 10% and a temperature of 720° C. at a point 1 cm upstream of the porous ceramic body.

Next, with the flow rate of the exhaust gas unchanged, the supply of light oil was little reduced such that the exhaust gas temperature was lowered to 600° C. The concentration of sulfur dioxide in the exhaust gas was measured by the non-dispersive infrared absorption (NDIR) method at two points immediately before and after passage of the exhaust gas through the porous ceramic body. It should be noted that the exhaust gas temperature of 600° C. is a temperature which the manifold outlet temperature readily reaches when a truck engine is operated under high speed loads.

The catalyzed porous ceramic body having undergone the exposure test was then used to collect particulates. Particulate trapping was carried out by placing the body in an exhaust duct at a position 1.5 meters spaced from the outlet of a 2.3-liter Diesel engine which was operated at 1,000 revolutions per minute under a torque of 10 kg-m.

After 10% by weight of particulates were collected on the catalyzed porous ceramic body in this way, the body was removed and placed in a thermogravimeter. The relationship of the weight loss of the collected particulates to the temperature was determined at an air flow rate of 1 liter/minute and a temperature rise rate of 20° C./minute. The temperature at which 50% by weight of the collected particulates were removed is designated T50 and the temperature at which 90% by weight of the collected particulates were removed is designated T90. These temperatures are to evaluate the activity of the catalyst. The results are shown in the following Table.

The catalysts used in the experiments are described below. Some catalysts fall within the scope of the present invention and the remainings fall outside the scope of the present invention.

Ten catalysts falling within the scope of the exhaust gas purifying catalyst of the present invention were prepared and carried on porous ceramic bodies to obtain Samples 1 to 10.

SAMPLE 1

Four solutions were separately prepared. An aqueous solution of 171 grams of cupric nitrate $Cu(NO_3)_2.3H_2O$ in 86 ml of distilled water was prepared. A homogeneous aqueous solution of vanadium oxalate was prepared by adding 83 grams of ammonium vanadate $NH_4VO_3$ in 745 ml of distilled water and adding 178 grams of oxalic acid in small portions to the mixture with heating and stirring. An aqueous solution of 95 grams of zirconium oxynitrate $ZrO(NO_3)_2.2H_2O$ in 378 ml of distilled water was prepared. A dispersion was prepared by dispersing 50 grams of titania as a solid acid in 335 ml of distilled water. The separately prepared four solutions were poured into a 5-liter vessel and vigorously agitated with a high-speed homomixer to form a slurry of a titania-containing catalyst.

In the catalyst slurry was immersed a reticulated porous ceramic body composed predominantly of cordierite and having an exhaust gas inlet surface of racing track shape of 280×120 mm, a length of 60 mm, a filter gauge of 20 mesh (average 20 cells per linear inch), and a bulk specific gravity of 0.45. The body was removed, deprived of excess of the applied slurry, dried in hot drying air at 150° C., and sintered at 600° C. for 2 hours in air. The amount of the catalyst attached was 4.5% by weight based on the weight of the porous ceramic body. The catalyst had a composition or atomic ratio of Cu/V/Zr/Ti of 1/1/0.5/0.89.

SAMPLES 2-10

Catalysts were prepared by the same procedure as used for Sample 1 except that the aqueous solution of 95 grams of zirconium oxynitrate in 378 ml of distilled water in Sample 1 was replaced by the following solutions, and then applied to porous ceramic bodies by the same procedure as used for Sample 1.

| Sample 2 | Aluminum nitrate $Al(NO_3)_3.9H_2O$ | 133 grams |
| --- | --- | --- |
| | Distilled water | 531 ml |
| Sample 3 | Nickel nitrate $Ni(NO_3)_2.6H_2O$ | 103 grams |
| | Distilled water | 412 ml |
| Sample 4 | Chromium nitrate $Cr(NO_3)_3.9H_2O$ | 142 grams |
| | Distilled water | 567 ml |
| Sample 5 | Iron nitrate $Fe(NO_3)_3.9H_2O$ | 143 grams |
| | Distilled water | 572 ml |
| Sample 6 | Lanthanum nitrate $La(NO_3)_3.6H_2O$ | 153 grams |
| | Distilled water | 613 ml |
| Sample 7 | Manganese nitrate $Mn(NO_3)_2.nH_2O$ | 102 grams |
| | Distilled water | 406 ml |
| Sample 8 | Zinc nitrate $Zn(NO_3)_2.6H_2O$ | 105 grams |
| | Distilled water | 420 ml |
| Sample 9 | Lead nitrate $Pb(NO_3)_2$ | 117 grams |
| | Distilled water | 468 ml |
| Sample 10 | Cerium nitrate $Ce(NO_3)_3.6H_2O$ | 154 grams |

-continued

| | |
|---|---|
| Distilled water | 616 ml |

In Samples 2 to 10, the amount of the catalyst attached was 4 to 5% by weight based on the weight of the porous ceramic body. The catalyst had a composition or atomic ratio of Cu/V/M/Ti of 1/1/0.5/0.89 where M is Al, Ni, Cr, Fe, La, Mn, Zn, Pb, or Ce, and Ti is given as the solid acid.

For comparison purposes, samples 11 and 12 were prepared.

SAMPLE 11

Sample 11 was prepared by the same procedure as Sample 1 except that the zirconium oxynitrate was omitted. The amount of the catalyst attached was 4.5% by weight based on the weight of the porous ceramic body. The catalyst had a composition or atomic ratio of Cu/V/Ti of 1/1/0.89.

SAMPLE 12

This sample is a control sample consisting of a porous ceramic body.

TABLE

| Sample | | T50, °C. | T90, °C. | $SO_2$ to $SO_3$ % Conversion |
|---|---|---|---|---|
| 1 | Cu—V—Zr | 335 | 445 | 33 |
| 2 | Cu—V—Al | 330 | 455 | 33 |
| 3 | Cu—V—Ni | 335 | 465 | 16 |
| 4 | Cu—V—Cr | 335 | 465 | 24 |
| 5 | Cu—V—Fe | 345 | 470 | 15 |
| 6 | Cu—V—La | 335 | 460 | 24 |
| 7 | Cu—V—Mn | 335 | 460 | 20 |
| 8 | Cu—V—Zn | 335 | 470 | 20 |
| 9 | Cu—V—Pb | 335 | 470 | 22 |
| 10 | Cu—V—Ce | 335 | 470 | 23 |
| 11* | Cu—V | 340 | 480 | 33 |
| 12* | — | 495 | 565 | — |

*comparative samples

As evident from the data of Sample 12 in the Table, the particulate burning temperatures are T50=495° C. and T90=565° C. for the catalyst-free porous ceramic body. For Sample 11, copper-vanadium catalyst which is disclosed by us in Japanese Patent Application Kokai No. 58-143840, the particulate burning temperatures are lowered to T50=340° C. and T90=480° C. For Samples 1 to 10, copper-vanadium catalysts having component (c) of Zr, Al, Ni, Cr, Fe, La, Mn, Zn, Pb, or Ce added, T90 of the samples after the durability test is further reduced by 10° to 35° C. from that for sample 11.

The reduction of T90 by 10° to 35° C. leads to the increased opportunity that particulates would be burned out when the exhaust gas temperature reaches the particulate burning temperature. This enables the regeneration mode wherein particulates on the collector are burned out for regeneration by utilizing the heat of exhaust gas, achieving efficient particulate removal.

For Samples 3 to 10, copper-vanadium catalysts having component (c) of Ni, Cr, Fe, La, Mn, Zn, Pb, or Ce added, the percent conversion of $SO_2$ in combustion gas to $SO_3$ is 15 to 24% and thus reduced to two thirds of that with sample 11, (c)-free catalyst. The addition of component (c) has an observable effect.

It is claimed:

1. A catalyst suitable for assisting in purifying exhaust gases consisting essentially of
   (a) at least one member selected from the group consisting of copper and copper compounds;
   (b) at least one member selected from the group consisting of vanadium and vanadium compounds; and
   (c) at least one member selected from the group consisting of zirconium, aluminum, iron, lanthanum, lead, cerium and compounds thereof.

2. The catalyst aocording to claim 1 which further comprises
   (d) at least one member selected from the group consisting of platinum, rhodium, palladium and compounds thereof.

3. The catalyst according to claim 1 wherein the catalyst is carried on a particulate collector in an amount of 1 to 20% by weight based on the weight of the collector.

4. A particulate collector carrying thereon the catalyst of claim 1.

5. A particulate collector carrying thereon the catalyst of claim 2.

6. A particulate collector carrying thereon a catalyst suitable for assisting in purifying exhaust gases, said catalyst comprising
   (a) at least one member selected from the group consisting of copper and copper compounds;
   (b) at least one member selected from the group consisting of vanadium and vanadium compounds;
   (c) at least one member selected from the group consisting of zirconium, aluminum, nickel, iron, manganese, lanthanum, chromium, zinc, lead, cerium and compounds thereof; and
   (d) at least one member selected from the group consisting of platinum, rhodium, palladium and compounds thereof.

7. The particulate collector according to claim 6 wherein the compounds (a), (b) and (c) are present in an atomic ratio of (a)+(b)/(c) of from 99/1 to 20/80 and an atomic ratio of (a)/(b) of from 99/1 to 1/99.

8. The particulate collector according to claim 6 wherein the catalyst is carried on said particulate collector in an amount of 1 to 20% by weight based on the weight of the collector.

9. The particulate collector according to claim 8 wherein said collector is selected from a ceramic honeycomb or a ceramic foam.

10. The particulate collector according to claim 8 wherein compound (d) is present in an amount of about 0.01 to 5 grams per kilogram of the collector.

11. The catalyst according to claim 1 wherein components (a), (b) and (c) are present in an atomic ratio of (a)+(b)/(c) of from 99/1 to 20/80 and an atomic ratio of (a)/(b) of from 99/1 to 1.99.

* * * * *